United States Patent

Haas

[11] 3,900,577
[45] Aug. 19, 1975

[54] METHOD FOR PREPARING EXPANDED DRY GELS

[75] Inventor: Gerhard J. Haas, Woodcliff Lake, N.J.

[73] Assignee: General Foods Corporation, White Plains, N.Y.

[22] Filed: Aug. 16, 1971

[21] Appl. No.: 172,315

[52] U.S. Cl. ............... 426/312; 426/318; 426/319; 426/350; 426/385; 426/444; 426/470; 426/167; 426/168
[51] Int. Cl. .............................................. A23g 3/00
[58] Field of Search ..................... 99/129–133, 99/134, 136, 192, 197, 199; 426/312, 350, 351, 385, 444, 447, 470, 524, 167–170, 281, 318, 319

[56] References Cited
UNITED STATES PATENTS

| | | | |
|---|---|---|---|
| 1,855,670 | 4/1932 | Greenwood | 99/134 |
| 2,278,472 | 4/1942 | Musher | 99/192 |
| 2,309,007 | 1/1943 | Parsons | 99/192 |
| 3,012,893 | 12/1961 | Kremzner | 99/192 |
| 3,066,030 | 11/1962 | Eolkin | 426/470 |
| 3,086,370 | 4/1963 | Barnes | 99/192 |
| 3,323,923 | 6/1967 | Fiore | 99/199 |
| 3,362,830 | 1/1968 | Addesso | 99/199 |
| 3,419,402 | 12/1968 | Laskin | 426/385 |
| 3,503,757 | 3/1970 | Rubenstein | 99/136 |
| 3,535,126 | 10/1970 | Hass | 99/193 |
| 3,560,229 | 2/1971 | Laskin | 99/136 |
| 3,674,507 | 7/1972 | Carasso | 99/136 |

*Primary Examiner*—Norman Yudkoff
*Assistant Examiner*—Martin G. Mullen
*Attorney, Agent, or Firm*—Thomas R. Savoie; Daniel J. Donovan; Bruno P. Struzzi

[57] ABSTRACT

Expanded dry gels are produced by subjecting gels to a pressure of greater than about 50 p.s.i.g. and while still under pressure, freezing the gels. Subsequently the pressure is released and the frozen gels are thawed and dried. The pressure-frozen gels retain their shape while comparable non-pressure-frozen gels shrivel and shrink during drying.

6 Claims, No Drawings

3,900,577

METHOD FOR PREPARING EXPANDED DRY GELS

BACKGROUND OF THE INVENTION

This case is related to my U.S. Pat. No. 3,535,126 issued Oct. 20, 1970 and to my co-pending application, Ser. No. 48,560, filed June 22, 1970, both entitled Method of Increasing the Permeability of Cellular Materials, and both of which are hereby incorporated by reference.

I have previously disclosed that dried cellular materials may be rendered more permeable by subjecting the cellular material to a pressure-freezing operation. It has now been discovered that it is also advantageous to pressure-freeze gelled materials prior to drying in order to minimize shrivelling and shrinking during the drying operation.

SUMMARY OF THE INVENTION

The process taught in the present invention makes possible the production of dried gelled materials which are much less shrivelled than conventional air-dried or oven-dried gels. The expanded dried gelled materials of this invention have a variety of uses in the confectionary field. These dried gels may be used as the centers of chocolate covered candies or may be used as either chewable or hard candies. Preferably the pressure-frozen and dried gels will also include various flavoring and/or coloring agents to render them more suitable for confectionary use. These expanded gels may be especially useful in the production of low-calorie confections since their density is less than conventionally dried gels and any given size candy will have a reduced caloric value. The dried gels of this invention, because of their physical structure, may also have a mouthfeel or texture which will be particularly desirable to certain groups of consumers.

DESCRIPTION OF THE INVENTION

According to the present invention gels, such as gelatin and agar, are placed in a pressure vessel and the pressure in the vessel is raised to about 50 to 1500 p.s.i.g. or higher by the introduction of a pressurized gas. The gel is held at the elevated pressure for a sufficient time to enable the gas to permeate the gel and, while still at the elevated pressure, the temperature is reduced to below about $-10°C$. The gel is permitted to throughly freeze and while the gel is still frozen the pressure is released. The gel, which may first be permitted to thaw, is then dried such as by air drying, or oven air drying; alternatively the pressure frozen gel may be freeze dried.

According to the process of this invention complete freezing is necessary in order to achieve the desired effect. Just cooling to $0°C$ gives no effect.

Immediate drying is not necessary, most of the effect is retained even if drying takes place several hours after thawing. Rates of pressurization and pressure release are not critical, although with some gels it may be necessary to maintain a longer period of high pressure before freezing, since it appears that diffusion of the gas into the gel is an important criteria of this invention.

The pressure to which the gel is subjected will depend upon the type and strength of the particular gel and the effect desired. Another variable to be considered in determining the pressure to be used is the particular gas being used. For instance, when using some of the fluorinated hydro-carbon gases favorable results are obtained at relatively low pressure; whereas, when using gases such as air and nitrogen higher pressures may be required to achieve equivalent results.

Certain gases, such as carbon dioxide, nitrous oxide and helium have not proven successful in this invention. These gases apparently diffuse too quickly from the thawed gel to prevent shrivelling and shrinking of the pressure-frozen gel during drying. Gases such as nitrogen, air, carbon monoxide, fluorinated hydrocarbons, ethane, propane, ethylene, neon and argon are among the gases which will prove useful in this invention. In general the effective gases are those which have low diffusion rates through artificial membranes such as thin rubber membranes and regenerated cellulose membranes. Additionally it is desirable if the gas does not have a high solubility in water. None of the advantages of this invention have been found to occur by merely pressurizing the gels. Evidently without the freezing step any gas absorbed by the gel under pressure is not retained once the pressure is removed. Surprisingly, however, if the gel is frozen after pressurization, significant gas is retained within the gel even after the pressure is released and the gel is thawed. In contrast to these pressure frozen gels which retain dissolved gas after thawing, pure water which has been pressure frozen and thawed retains very little, if any, of its dissolved gas.

Experiments have shown that with 2% agar gels, about 0.35 ml of nitrogen per gram of gel is retained for hours and probably days after gas saturation, pressure freezing and thawing. This gas, which is in the form of tiny bubbles, helps to retain the objects' overall shape during drying. Gas retention in 2% agar gels which had been subjected to high nitrogen pressure (1000 p.s.i.g.) for either overnight or for a short time but which gels were not frozen was found to decrease very quickly (one or two hours) to a level barely more than that of non-treated gels.

The invention is further illustrated but not limited by the following Examples.

EXAMPLE 1

An aqueous dispersion containing 15% gelatin by weight was mixed with peppermint oil and passed through an homogenizer. Some of this mixture was allowed to gel and saved for direct air-drying. The remainder was poured into small plates and allowed to gel. These plates were placed in a Parr bomb and pressurized with nitrogen at 1000 p.s.i.g. for about 16 hours. The bomb was then placed in a $-24°C$ bath for seven hours and then the pressure was gradually released over a period of about 18 hours. The gels were removed from the bomb, thawed and cut into cubes (about 1 cubic centimeter). These pressure-frozen cubes together with non-pressure-frozen cubes were oven air-dried for three days at about $50°C$. The pressure-frozen cubes were found to be significantly less shrivelled and shrunk than were the untreated cubes.

EXAMPLE 2

A double-strength strawberry flavored gelatin dessert (Jell-O) was treated in one of the following ways:
1. Not treated, air-dried at about $35°C$ for 13 days.
2. Frozen ordinarily, then air-dried for 12 days.
3. Pressurized with nitrogen overnight at 1000 p.s.i.g.

pressure-frozen, then thawed and air-dried for 12 days.

Sample (3) retained its shape fairly well, but (1) and (2) shrivelled and shrank.

EXAMPLE 3

Gelatin gels of different concentrations (4, 8, 12, 16 and 20%) were prepared by adding water to gelatin powder while stirring throughly and then heating at 60°C in a water bath until complete dissolution. The clear liquids were cooled and allowed to gel during the night in a refrigerator.

Alginate gels were prepared by allowing a 5% calcium acetate solution to diffuse into a solution of the following composition: sodium alginate 1.5%, gum tragacanth 0.5%, malic acid 0.24%, flavor 0.39%, color 0.04% and water 97.33%, until gelation was complete.

The gelatin and alginate gels were cut into small pieces and pressurized with nitrogen at 1000 p.s.i.g. in a Parr bomb for several hours. The bomb was kept under pressure while placed in a cooling bath at −22°C for two hours. The frozen pieces of gel were finally thawed and air dried in a forced draft oven for an hour at 60°C and overnight at 35°C. The pieces were not found to have noticeably shrivelled or shrunk as a result of this drying operation.

Having thus described the invention what is claimed is:

1. A method of producing expanded, dried gels comprising the steps of:
   a. contacting a gelled material with a gas at a pressure of greater than about 50 p.s.i.g. for a period of time sufficient to enable the gas to diffuse into the gel, said gas being selected from the group consisting of nitrogen, air, carbon monoxide, fluorinated hydrocarbons, ethane, propane, ethylene, neon and argon;
   b. completely freezing the gelled material at a temperature below about −10°C while still under said pressure;
   c. releasing the said pressure on the frozen gelled material; and
   d. drying the gel.
2. The method of claim 1 wherein the gelled material is a gelatin or agar gel.
3. The method of claim 1 wherein the gelled material is flavored.
4. The method of claim 1 wherein the gel is thawed before drying.
5. The method of claim 4 wherein the thawed gel is oven dried.
6. The method of claim 4 wherein the thawed gel is air dried.

* * * * *